US010761284B2

(12) United States Patent
Bastola et al.

(10) Patent No.: US 10,761,284 B2
(45) Date of Patent: Sep. 1, 2020

(54) MATERIAL FORMULATION FOR OVER MOLD COVER FIBER OPTIC CABLE

(71) Applicant: CORNING OPTICAL COMMUNICATIONS LLC, Hickory, NC (US)

(72) Inventors: Anil Bastola, Fort Worth, TX (US); Wei Liu, Fort Worth, TX (US); Ziwei Liu, Fort Worth, TX (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 0 days.

(21) Appl. No.: 16/194,806

(22) Filed: Nov. 19, 2018

(65) Prior Publication Data

US 2019/0086625 A1 Mar. 21, 2019

Related U.S. Application Data

(63) Continuation of application No. PCT/US2017/033448, filed on May 19, 2017.
(Continued)

(51) Int. Cl.
*G02B 6/44* (2006.01)
*C08G 18/38* (2006.01)
(Continued)

(52) U.S. Cl.
CPC .......... *G02B 6/4432* (2013.01); *C08G 18/36* (2013.01); *C08G 18/3893* (2013.01);
(Continued)

(58) Field of Classification Search
CPC .... C08G 18/4804; C08G 18/00; C08G 18/32; C08G 18/36; C08G 18/3893;
(Continued)

(56) References Cited

U.S. PATENT DOCUMENTS 5,998,574 A 12/1999 Fishback et al.
6,075,065 A 6/2000 Yamazaki et al.
(Continued)

FOREIGN PATENT DOCUMENTS

WO WO-2013146263 A1 * 10/2013 ......... C08G 18/4891

OTHER PUBLICATIONS

Machine Translation of WO 2013146263 (Year: 2020).*
(Continued)

*Primary Examiner* — Michael M Dollinger
(74) *Attorney, Agent, or Firm* — William D. Doyle (57) ABSTRACT

A polyurethane composition is provided. The polyurethane composition includes a first part of a first polytetramethylene oxide, a second polytetramethylene oxide, and a castor oil based polyol. The second polytetramethylene oxide has a higher viscosity than the first polytetramethylene oxide. The polyurethane composition also includes a second part of methylene diphenyl diisocyanate. Also provided is a fiber optic cable assembly incorporating the polyurethane composition as an overmold. The overmold has a glass transition temperature of less than −40° C. measured according to differential scanning calorimetry. Further provided is a method of applying an overmold to a fiber optic cable assembly.

13 Claims, 6 Drawing Sheets

Related U.S. Application Data (60) Provisional application No. 62/341,970, filed on May 26, 2016.

(51) Int. Cl.
   *C08G 18/36* (2006.01)
   *C08G 18/48* (2006.01)
   *C08G 18/76* (2006.01)
   *C08G 18/66* (2006.01)

(52) U.S. Cl.
   CPC ..... *C08G 18/4804* (2013.01); *C08G 18/4854* (2013.01); *C08G 18/6696* (2013.01); *C08G 18/7664* (2013.01); *G02B 6/4434* (2013.01); *G02B 6/4495* (2013.01); *C08G 2190/00* (2013.01)

(58) Field of Classification Search
   CPC ............ C08G 18/4854; C08G 18/6696; C08G 18/76; C08G 18/7664; C08G 18/12; C08G 18/4808; C08G 2190/00; C08G 18/4812; C08G 18/4816; G02B 6/4432; G02B 6/4434; G02B 6/4495
   See application file for complete search history.

(56) References Cited

U.S. PATENT DOCUMENTS

| | | | |
|---|---|---|---|
| 6,475,029 B2 | 11/2002 | Tucker et al. | |
| 2002/0127264 A1* | 9/2002 | Felt | A61B 17/562 424/423 |
| 2002/0132118 A1 | 9/2002 | Hirai et al. | |
| 2003/0195628 A1* | 10/2003 | Bao | A61B 17/7097 623/17.12 |
| 2003/0220649 A1* | 11/2003 | Bao | A61B 17/7097 606/90 |
| 2009/0211810 A1* | 8/2009 | Huspeni | C08G 18/10 174/77 R |
| 2013/0136913 A1* | 5/2013 | Chiyonobu | C08G 18/0823 428/221 |
| 2013/0259434 A1 | 10/2013 | Briguier et al. | |
| 2013/0338330 A1* | 12/2013 | Nakagawa | C07C 263/10 528/65 |
| 2014/0234284 A1* | 8/2014 | Schonberger | A61L 15/26 424/94.1 |
| 2014/0309397 A1* | 10/2014 | Czeiszperger | C08G 18/4825 528/85 |
| 2015/0210799 A1 | 7/2015 | Tanaka | |
| 2015/0342276 A1* | 12/2015 | Yamasaki | A47D 1/00 2/67 |
| 2015/0346387 A1* | 12/2015 | Yamasaki | C07D 295/08 528/85 |
| 2018/0155590 A1* | 6/2018 | Schmatloch | C08G 18/4854 |
| 2018/0162988 A1* | 6/2018 | Colson | C09J 175/08 |
| 2018/0187008 A1* | 7/2018 | Kurtoglu | C08G 18/7671 |

OTHER PUBLICATIONS

Terethane PTMEG Product Data. Lycra Company. Available online at https://terathane.com/products/terathane-ptmeg/product-data (Year: 2019).*

Micro Chek 11. Product data sheet. Valtris Specialty Chemicals. Available online at http://www.valtris.com/product/micro-chek-11/ (Year: 2020)*

International Search Report and Written Opinion of the International Searching Authority: PCT/US2017/033448; dated Aug. 1, 2017; 8 Pages, ISA/US Commissioner for Patents.

* cited by examiner

MATERIAL FORMULATION FOR OVER MOLD COVER FIBER OPTIC CABLE

CROSS-REFERENCE TO RELATED APPLICATIONS

This application is a continuation of International Application No. PCT/US17/33448, filed on May 19, 2017, which claims the benefit of priority to U.S. Application No. 62/341,970, filed on May 26, 2016, both applications being incorporated herein by reference.

BACKGROUND

The disclosure relates generally to optical cables and more particularly to a material for overmold covers of an optical cable. A main optical cable line can include many branch lines that divert a portion of the main optical cable to end users. Some main optical cable lines are manufactured with branch lines located in predetermined locations in order to avoid having a technician splice on branch lines in the field, which is costly, time-consuming, and less accurate than can be accomplished in the manufacturing facility. In branching the optical fibers, vulnerabilities are created in the protective jacket of the main optical cable line. These vulnerabilities are potential sources of mechanical and environmental damage to the underlying optical fibers.

SUMMARY

In one aspect, a polyurethane composition is provided. The polyurethane composition includes a first part of a first polytetramethylene oxide, a second polytetramethylene oxide, and a castor oil based polyol. The second polytetramethylene oxide has a higher viscosity than the first polytetramethylene oxide. The polyurethane composition also includes a second part of methylene diphenyl diisocyanate.

In another aspect, a fiber optic cable assembly is provided. The fiber optic cable assembly includes a main cable carrying a plurality of optical fibers and a tether cable spliced to at least one of the plurality of optical fibers at a splicing location. An overmold covers the splicing location. The overmold is comprised of a polyurethane composition. The polyurethane composition includes a first part of a hardener and a second part of a prepolymer. The hardener includes an ester polyol and at least one polyether polyol. Additionally, the overmold has a glass transition temperature less than −40° C. measured according to differential scanning calorimetry.

In a further aspect, a method for applying an overmold to a fiber optic cable assembly is provided. The method involves mixing a first part with a second part to form a polyurethane composition. The first part includes a first polytetramethylene oxide, a second polytetramethylene oxide having a viscosity greater than the first polytetramethylene oxide, and a castor oil based polyol. The second part comprises methylene diphenyl diisocyanate. The method also involves preparing a surface of the fiber optic cable assembly with a primer compound and without flame-treating the surface and molding the polyurethane composition around at least a portion of the fiber optic cable assembly to create an overmold.

Additional features and advantages will be set forth in the detailed description that follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of a polyurethane composition that is particularly suitable for an overmold on a fiber optical cable assembly are provided. In an embodiment, the overmold encompasses a region of the optical cable assembly from which a tether projects from the optical cable assembly. Generally, the polyurethane is composed of an A part and a B part that are mixed in a ratio of 1A:1.7B, by weight. In embodiments, the A part is comprised of methylene diphenyl diisocyanate (MDI) prepolymer. In embodiments, the B part is comprised predominantly of three polyols, including two polyether polyols and an ester polyol. The reacted polyurethane of this three polyol composition exhibits enhanced physical properties and chemical resistance. In certain embodiments, the polyurethane composition is used as an overmold for a fiber optic cable assembly. Advantageously, the polyurethane composition provides enhanced mechanical and environmental protections for a fiber optic cable assembly.

Figure 1:
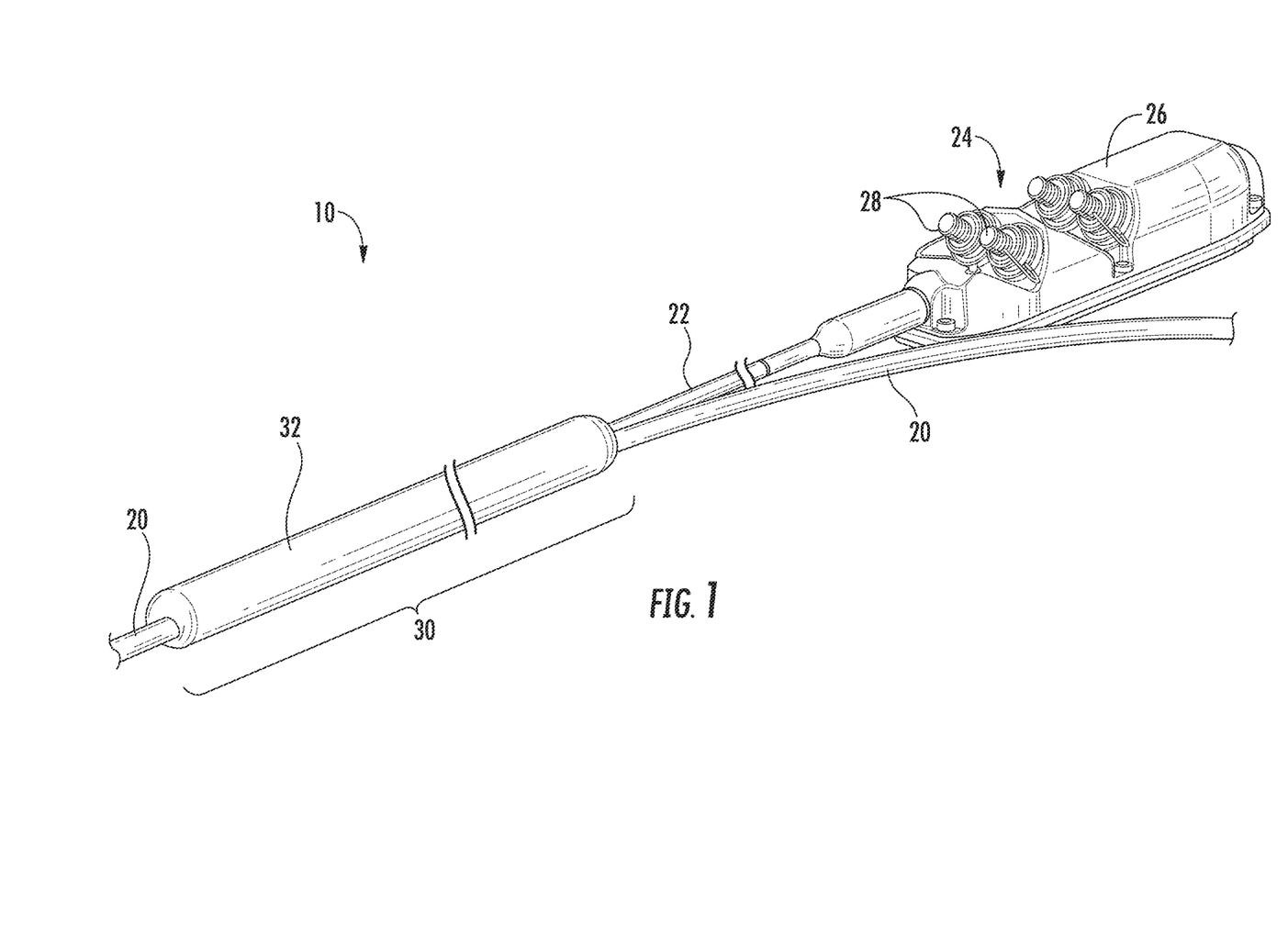
FIG. 1 depicts a fiber optical cable assembly having an overmold made from the polyurethane composition according to an exemplary embodiment.

FIG. 1 depicts an exemplary embodiment of a fiber optical cable assembly 10, such as a FlexNAP™ system by Corning Incorporated. In the embodiment depicted in FIG. 1, the fiber optic cable assembly 10 includes a distribution cable 20 and a tether cable 22. The distribution cable 20 contains a plurality of cable optical fibers, and the tether cable 22 is spliced into one or more of the cable optical fibers to divert such optical signals carried on such cable optical fibers from the distribution cable 20 into the tether optical fibers. For example, the distribution cable 20 may run into a neighborhood to carry optical communication services to the entire neighborhood while the tether cable 22 may split from the distribution cable 20 to deliver the optical communication services to an individual home in the neighborhood. While FIG. 1 depicts only a single tether cable 22, a distribution cable 20 can have several additional tether cables 22 attached at various locations along the length of the distribution cable 20 depending on the needs of the installation. The tether cable 22 terminates at a connector 24. As depicted in FIG. 1, the connector 24 is a multi-access terminal 26 with four terminal ports 28.

Figure 2:
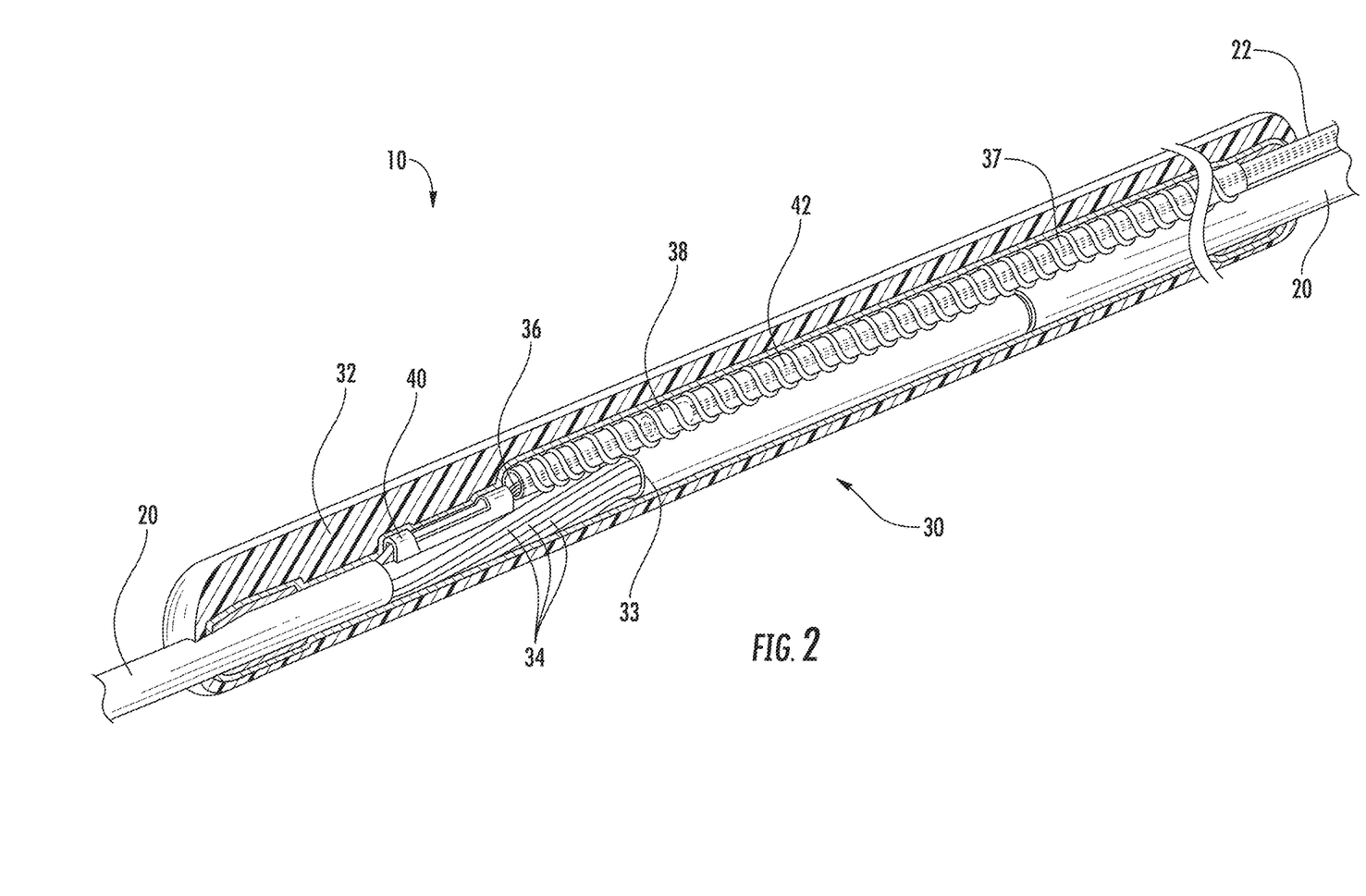
FIG. 2 depicts a cross-sectional view of the overmold of a fiber optical cable assembly according to an exemplary embodiment.

The location where the tether cable 22 is spliced to the distribution cable 20 is referred to as the mid-span access location 30, and the mid-span access location 30 is enveloped in an overmold 32. In embodiments, the overmold 32 extends seven inches from both sides of the splice location along the longitudinal direction of distribution cable 20. FIG. 2 provides a cross-sectional view of the mid-span access location 30. As depicted in FIG. 2, a section of a jacket 33 surrounding the distribution cable 20 is removed to reveal a plurality of buffer tubes 34. The buffer tubes 34 contain bundles of cable optical fibers 36, and the size of the distribution cable 20 dictates the number of buffer tubes 34 and consequently the number of optical fibers 36 that can be held within the distribution cable 20.

As depicted in FIG. 2, a buffer tube 34 is selected for splicing to the tether cable 22. In some embodiments, the distribution cable 20 is manufactured to provide for splicing of tether cables 22 at predetermined locations. In such instances, the buffer tube 34 can be manufactured for splicing at such predetermined locations. The buffer tube 34 around the optical fibers 36 is removed so that an optical fiber or optical fibers 37 of the tether cable 22 can be spliced to one or more of the optical fibers 36 of the buffer tube 34. In a buffer tube 34 having a plurality of optical fibers 36, some or all of the optical fibers 36 may be spliced to a fiber of the tether cable 22 (i.e., manufactured to terminate at a predetermined splicing location), while the remaining optical fibers 36 disposed within the buffer tube 34 remain intact and continue through the distribution cable 20. The optical fibers 36 in the buffer tube 34 are then spliced to the optical fibers 37 in the tether cable 22. The splice joint can be protected with one or more splice protectors 38. Additionally, in the embodiment depicted in FIG. 2, the buffer tube 34 that is partially or fully spliced to the tether cable 22 is supported with a buffer tube transition piece 40 to protect the exposed open portion of the buffer tube 34 by filling the buffer tube transition piece 40 with a sealing material, such as silicone elastomer or epoxy material. Also, as depicted in the embodiment of FIG. 2, the exposed optical fibers 36, 37 on either side of the splice joint are protected with tubing 42 that is flexible and crush-resistant. In some embodiments, the regions of the distribution cable 20 and tether cable 22 in the mid-span access location 30 as well as the exposed buffer tubes and optical cables 36, 37 are additionally be wrapped in water-blocking wrap and protective layers before being encased in the overmold 32.

When deployed, fiber optic cable assemblies are buried underground, strung on poles, or both. Under these circumstances, the fiber optic cable assemblies can be exposed to a variety of environmental conditions that could potentially be harmful to the optical fibers carried in the fiber optic cable assemblies. Moreover, because the buffer tubes and optical fibers are exposed during the splicing process, the mid-span access location 30 is more vulnerable to mechanical damage and environmental conditions occasioned by the fiber optic cable assemblies being buried underground or strung on poles. Thus, the fiber optical cable assemblies, including the mid-span access locations, generally are formed to be capable of withstanding a variety of conditions including a range of operating temperatures (such as between −45° C. to 85° C.), humidity, ultraviolet radiation, fungal growth, and chemical exposure. The cable jacket 33 protects a majority of the fiber optic cable assemblies 10, while the overmold 32 is designed to protect the mid-span access location 30 from such damage and conditions. In embodiments, a polyurethane composition is utilized for creating the overmold 32 and provides an overmold with one or more of the advantageous properties discussed herein.

The polyurethane composition is formulated from three polyols that are reacted with an isocyante. Two of the polyols are polyether polyols. In an embodiment, the two polyether polyols are polytetramethylene oxides. In embodiments, a first polytetramethylene oxide is selected to have a viscosity of between 0.5 cP and 1.5 cP at 65° C., and in more specific embodiments, the first polytetramethylene oxide is selected to have a viscosity of 0.9 cP at 65° C. In embodiments, a second polytetramethylene oxide is selected to have a viscosity of between 3.5 cP and 4.0 cP at 65° C., and in more specific embodiments, the second polytetramethylene oxide is selected to have a viscosity of 4.0 cP at 65° C. These polytetramethylene oxides exhibit a strong bond with the cable jacket materials, such as polyethylene, and exhibit excellent mechanical performance at subzero temperatures. Further, the polytetramethylene oxides provide a high hydrolytic stability when combined with the isocyante, especially MDI.

The third polyol is an ester with multi-hydroxy functional groups. The ester polyol form a cross-linked structure when cured, which can help the sealant to maintain its mechanical properties at high temperature. Also, with this cross-linked structure, the sealant possesses a high strength and hardness such that it displays a strong resistance to deformation under long term stress. In a specific embodiment, the ester polyol is a castor oil based polyol, such as Polycin® T-400 (Vertellus Specialties Inc.). In embodiments, the castor oil based polyol has a hydroxyl value of 400. In further embodiments, the castor oil based polyol has a viscosity of 1500 cP at 25° C.

The three polyols form a first part of the polyurethane composition. The second part of the polyurethane composition is the diisocyanate prepolymer. Diisocyanates react with polyols to form the carbamate links of polyurethane materials. In an embodiment, the diisocyante is MDI; however, other diisocyantes can also be utilized, including toluene diisocyante, hexamethylene diisocyanate, and isophorone diisocyanate, among others. In a particular embodiment of the polyurethane composition including MDI as the prepolymer, the MDI has a % NCO content of 13 and a viscosity of 800 cPs at 45° C.

The first part including the three polyols and the second part including the diisocyanate are combined in a ratio of between 1:1 and 2:1 of the first part to the second part by weight. In a specific embodiment, the first part of the polyols and the second part of the diisocyanate are combined in a ratio of 1.7:1 of the first part to second part by weight.

In embodiments, the polyurethane composition includes additional additives to enhance certain aspects of the polyurethane composition. In certain embodiments, additives that protect the polyurethane against UV exposure are added to the polyurethane composition, including carbon black, rutile titanium oxide, hydroxybenzophenone, hydroxyphenylbenzotriazole, and hindered amine light stabilizers. In other embodiments, moisture absorbing additives, such as UOP L-paste (UOP, LLC), is added to reduce the formation of bubbles during curing. In further embodiments, a silane compound, such as Silquest A-1120 (Momentive Performance Materials, Inc.), is added to improve the cross-linking and to enhance the bonding between the polyurethane composition and the cable jacket surface. In still other embodiments, a mildewcide, such as heterocyclic mildewcides (e.g., Micro-Chek 11 from Ferro Corporation), is added to the polyurethane composition to prevent fungus growth. Additionally, treated clay can be used as a filler material and to improve the hardness of the polyurethane composition. Still further, a catalyst, such as a tin catalyst, can be included to control the reaction of the polyols and the diisocyanate. In various embodiments, the additives are added singly or in combination with each other.

Example

The first part (i.e., hardener) compositions were made with the components and parts by weight listed in Table 1, below. The parts by weight are inclusive of the boundary limits of the amounts for each component.

TABLE 1

Hardener Composition

| Components | Component Range (parts by weight) | Specific embodiment (parts by weight) |
| --- | --- | --- |
| T10 Polyol | 150-300 | 200 |
| T20 Polyol | 100-250 | 200 |
| T400 | 20-80 | 49.2 |
| Carbon Black | 10-20 | 16 |
| Treated Clay | 50-150 | 80 |
| Tin Catalyst | <0.5 | 0.05 |
| L-paste | <20 | 8 |
| Micro-Chek 11 | <10 | 5.5 |
| Silquest A-1120 | 1-5 | 2.5 |

The second part (prepolymer) was MDI with a % NCO content of 13 and a viscosity of 800 cPs at 45° C. The first part (hardener) and second part (prepolymer) were reacted in a mix ratio of 1.7:1, by weight.

The polyurethane was subjected to a variety of mechanical and chemical tests using both unaged and aged samples. The tests included fiber optic cable jacket adhesion, tensile strain and stress after ultraviolet light exposure, and tensile strain and stress after exposure to a variety of chemicals.

The jacket adhesion test provides information as to the bonding strength between the polyurethane composition and the jacket of a fiber optic cable, which is composed of polyethylene. The fiber optic cable jacket surface for each test cable was sanded and then wiped with alcohol to remove the debris. When the fiber optic cable jacket surface dried, a primer of chlorinated polyolefins was applied to the jacket surface. The prepared fiber optic cables were each aligned in the center of a 6" long PVC pipe having a diameter of 1.5". The polyurethane composition was molded around the fiber optic cable on the inside of the PVC pipe. Eleven samples were prepared in this manner, and all eleven were allowed to cure at room temperature. Six samples were then aged according to Telcordia GR-3122-CORE. This industry standard aging process involves three days of thermal aging at 85° C. followed by seven days of temperature and humidity cycling from 65° C. and 95% humidity to −40° C. (i.e., the humidity was set at 95% while at 65° C. and left to fluctuate at all other temperatures). The Telcordia GR-3122-CORE aging standard provides information regarding the ability of an overmold material to withstand conditions that can severely damage bonding between the fiber optic cable jacket and the overmold material as heat and moisture cause material deformation and degradation which affect the bonding.

Figure 3:
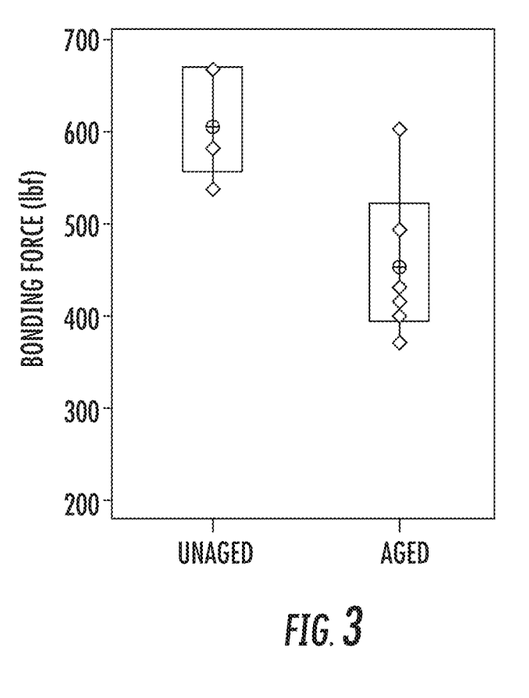
FIGS. 3-7 depict graphical representations of certain physical properties of the polyurethane composition according to an exemplary embodiment.

Then, using an Instron tensile tester, attempts were made to pull the fiber optic cable from the polyurethane composition. FIG. 3 depicts the bonding force measurement between the fiber optic cable and the polyurethane composition, i.e., the amount of force required to pull the fiber optic cable from the polyurethane composition. In the unaged samples, the bond was so strong that, in three of the five samples, the fiber optic cable jacket failed before failure of the bond between the fiber optic cable jacket and the polyurethane composition. In the aged samples, the bonding force was on average over 400 $lb_f$ with only one sample bond failing below 400 $lb_f$.

The strong bonding strength between the polyurethane composition and the cable jacket is the result of several interactions between the components of the polyurethane composition. First, the two polyether polyols, specifically the polytetramethylene oxides, in combination with MDI exhibit a strong resistance to hydrolytic degradation. Additionally, the castor oil based polyol, when combined with MDI, generates a cross-linked structure that allows the PU to have an excellent dimensional stability at high temperature. Further, the Silquest A-1120 is a diamino functional silane, which promotes the adhesion between the sealant and the cable. When the diamino functional silane is combined with a primer having a better moisture resistance property, the combination can prevent the penetration of moisture into the bonding area between the fiber optic cable jacket and the polyurethane composition, thereby avoiding bonding delamination.

Additional samples were molded into standard type IV tensile test bars (ASTM D638) by mixing and casting the polyurethane composition in a Teflon mold. The samples were cured for at least 24 hours at room temperature prior to testing the mechanical properties of the polyurethane compositions.

Figure 4:
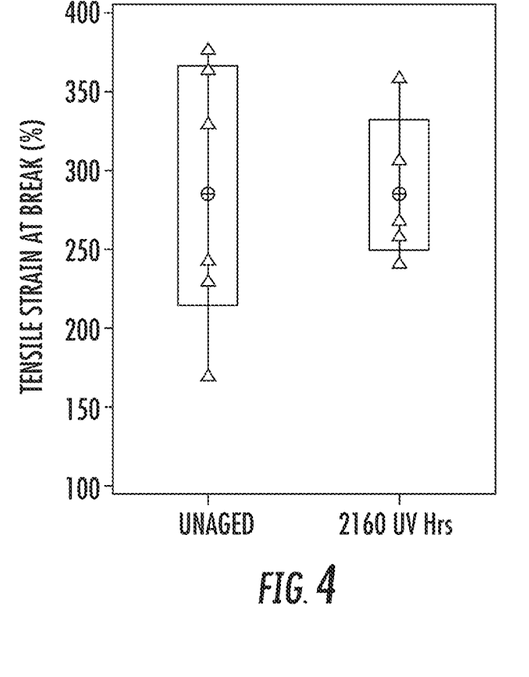
Figure 5:
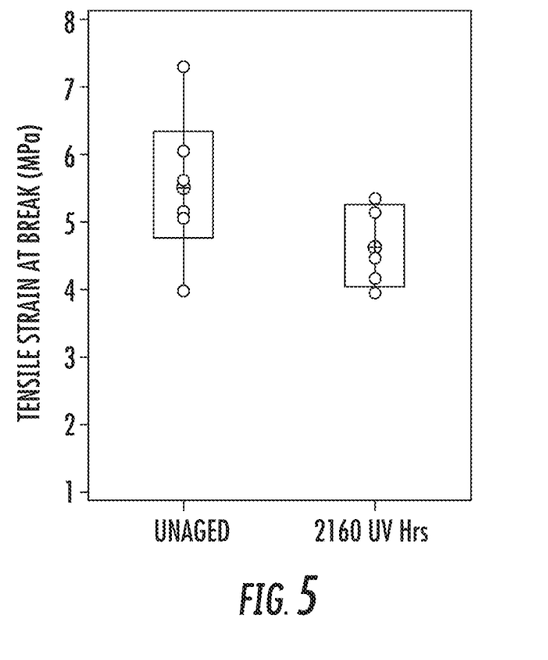

Five samples were tested for their tensile strain and stress at break without any aging. The remaining samples were subjected to a variety of environmental and chemical agings prior to testing. In testing the polyurethane composition's environmental response, five samples were placed in an ultraviolet chamber, equipped with UVB-313 lamps (wavelength of 313 nm), for 2160 hours (90 days) according to Telcordia GR-3122-CORE. In addition to the ultraviolet light exposure, moisture and temperature were cycled to imitate the outdoor environmental conditions. In order to meet the standard of Telcordia GR-3122-CORE, samples should not have a reduction in tensile stress or strain at break greater than 20% when compared to unaged samples. FIGS. 4 and 5 provide graphical representations of the tensile strain at break and the tensile stress at break, respectively, for both the unaged and ultravioletly aged samples. Notably, the aged polyurethane composition experienced very little reduction in tensile strain at break and only an 18% reduction in tensile stress at break. The 18% reduction is below the Telcordia standard and also less than half the reduction experienced by other standard overmold materials. The superior ultraviolet exposure performance is potentially attributable to the combination of the ultraviolet light absorber (carbon black in this case) and the use of polyester polyols, which have good ultraviolet light resistance properties.

Figure 6:
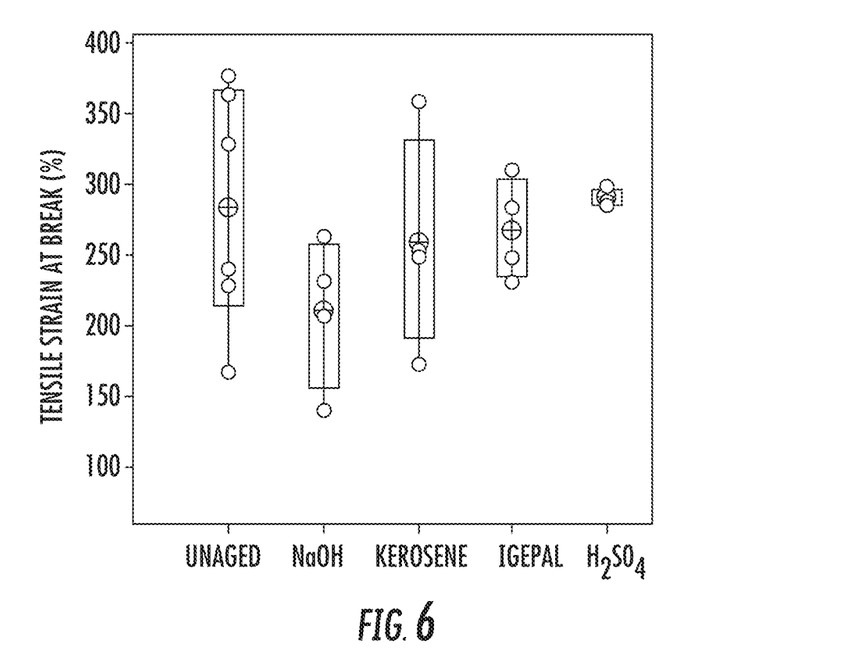
Figure 7:
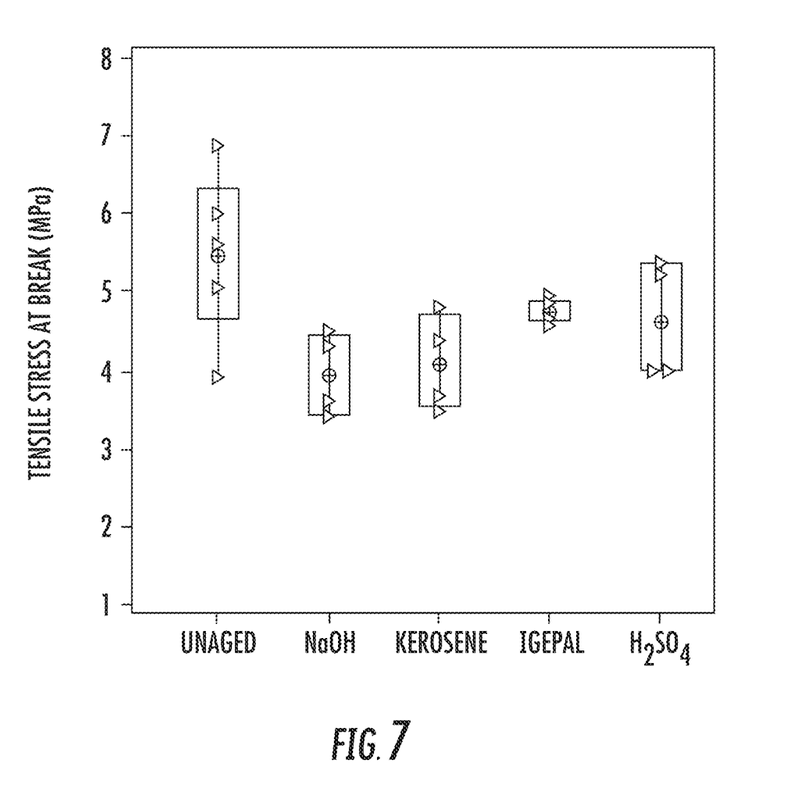

To evaluate their chemical resistance, five samples were immersed in four different chemicals, 0.2N NaOH, Kerosene, 10% IGEPAL, and 3% $H_2SO_4$ by weight, for one week (168 hrs.). FIGS. 6 and 7 show the tensile strain and stress at break after and before chemical immersion respectively. As demonstrated in FIGS. 6 and 7, the polyurethane composition exhibits a strong resistance to Kerosene, IGEPAL and $H_2SO_4$. The polyurethane composition experienced the greatest reduction in tensile strain and stress at break under NaOH immersion. However, even in light of this reduction, the polyurethane composition still had a higher tensile strain at break than other standard overmold materials tested.

Additional mechanical properties of the polyurethane composition were measured. A Shore A durometer was used to measure the hardness of the polyurethane composition. Fungus resistance was examined according to ASTM G21, and the cure schedule of sealant gel at 25° C. was measured using an ARES parallel plate rheometer. Furthermore, the glass transition temperature of the sealant gel was measured by differential scanning calorimetry using a Q20 DSC (TA Instruments). The tensile strain and stress at break were measured for the unaged samples according to the methods discussed above, and the measurements were also used to calculate the toughness. The measured values for the described mechanical properties are displayed in Table 2, below.

TABLE 2

Mechanical Properties of Polyurethane Composition

| Property | Measurement |
| --- | --- |
| Set time | ~430 seconds |
| Hardness | 70 Shore A |
| Glass Transition Temperature | −46.5° C. |
| Fungus Resistance (ASTM G21) | 0-None |
| Tensile Strain at Break | 459.2% |
| Tensile Stress at Break | 6.6 Mpa |
| Toughness | 15.05 Mpa |

In embodiments, the glass transition temperature is an important property for a polyurethane composition that is used for an overmold. Providing a low glass transition temperature, especially lower than −40° C., helps to maintain the flexibility of the fiber optic cable assembly during installation during cold weather and in extreme environments. Otherwise, the overmold could become brittle and crack during installation, exposing the vulnerable splice region of the optical cable assembly to environmental and chemical attack.

The temperature response of the polyurethane composition is another important property. For instance, when the polyurethane composition experiences a big temperature change (i.e., a temperature change of 40° C. to −40° C., such as might be experienced in summer and winter weather, respectively), a shear stress will develop between a fiber optic cable jacket and the polyurethane overmold as a result of the difference between the thermal expansion coefficients of the two materials. Additionally, a big change in temperature can cause a sudden volume change as a result of a phase change in the surrounding media (e.g., water). In an effort to compensate for the shear stresses occasioned by changes in temperature, the polyurethane composition possesses a glass transition temperature of −46.5° C., and in the thermal cycling range (85° C. to −40° C.), the polyurethane composition is always in the rubbery state, helping the bond to remain intact because of large change in volume is experienced in the temperature range.

The tensile strain and stress at break were each significantly higher than other standard overmold materials that were tested. The tensile strain at break was over 300% higher than standard overmold materials, and the tensile stress at break was almost 3 times higher than standard overmold materials. The improvements in the tensile strain and stress at break provided a similarly vast improvement in toughness (over 8 times higher) over standard overmold materials. The toughness, in particular, is an important property for an overmold because the toughness determines the impact resistance of the overmold, i.e., the ability of the overmold to absorb impact energy without breaking.

Figure 8:
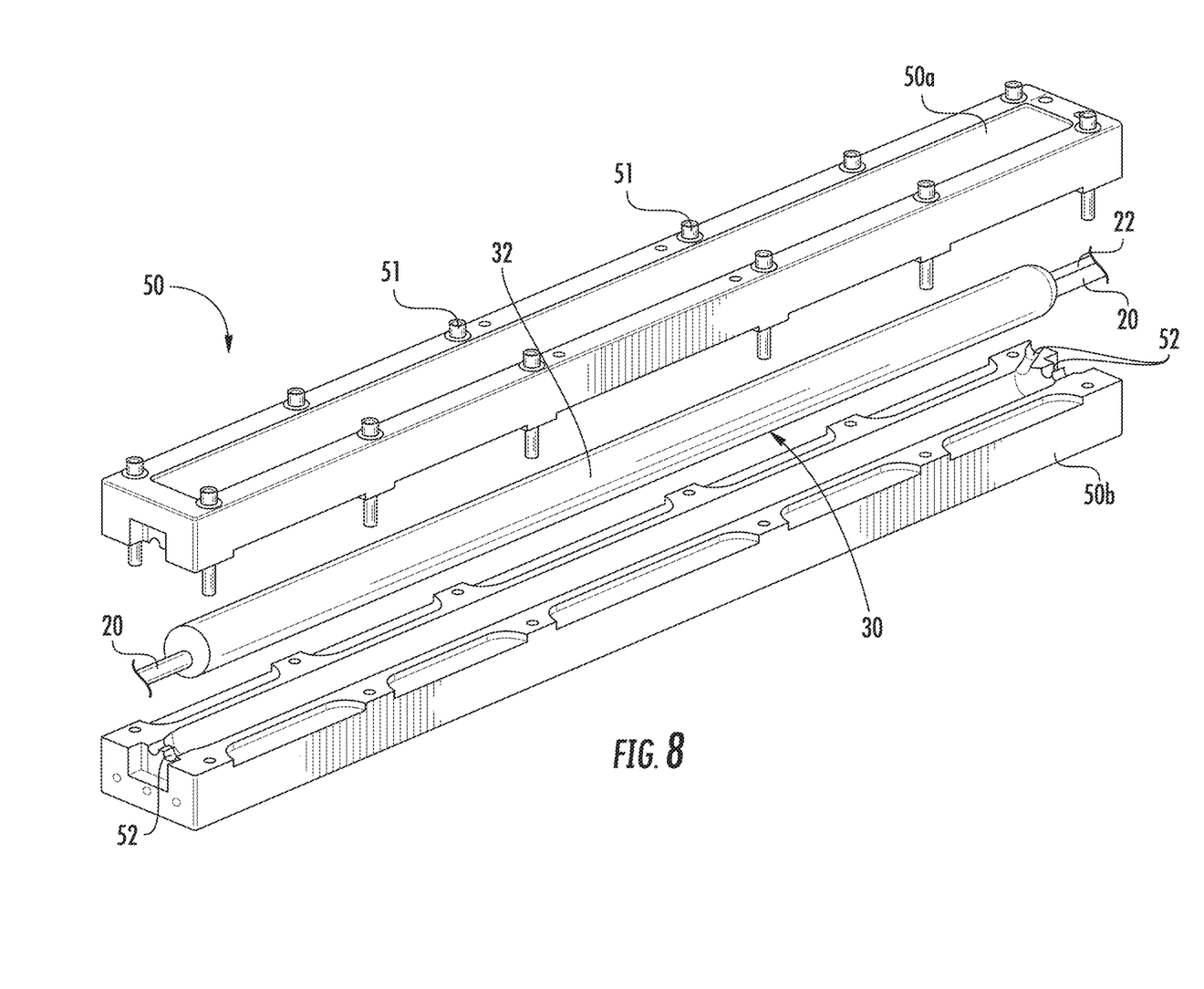
FIG. 8 depicts a mold structure for forming an overmold from the polyurethane composition according to an exemplary embodiment.

FIG. 9 depicts a mold 50 for forming the overmold 32 of a mid-span access location 30. The mold 50 comprises two halves 50a and 50b that clamp together around the mid-span access location 30 of the distribution cable assembly 10 to define a cavity that is injected with polyurethane composition. The two halves 50a, 50b may be secured together using suitable fasteners 51, such as screws or bolts. The mold 50 further defines scalloped depressions 52 for receiving the distribution cable 20 and the tether cable 22. In an embodiment, the distribution cable 20 and tether cable 22 are treated with a primer to enhance adhesion between the polyurethane composition and the cable jacket 33. In a specific embodiment, the primer is chlorinated polyolefins. Advantageously, the polyurethane composition strongly adheres to the cable jacket 33 without having to flame brush the cable jacket 33 prior to forming the polyurethane composition into the overmold 32, which avoids the need for the time-consuming, labor-intensive, and dangerous process of flame-brushing. Additionally, unlike flame brushing, which only renders the cable jacket 33 receptive to the overmold 32 for a matter of minutes, the primer treatment render the fiber optic cable assembly prepared to receive the overmold 32 for days. After the distribution cable assembly 10 is positioned in the mold, the polyurethane composition is injected and left for a time to cure. Thereafter, the fasteners 51 can be undone or removed such that the two halves 50a. 50b can be separated, and the fiber optic cable assembly 10 with overmold 32 can be removed from the mold 50.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A polyurethane composition, comprising:
   a first part, comprising:
      a first polytetramethylene oxide having a viscosity of between 0.5 cP to 1.5 cP at a temperature of 65° C.;
      a second polytetramethylene oxide having a viscosity of between 3.5 cP and 4.5 cP at a temperature of 65° C.; and
      a castor oil based polyol; and
   a second part comprising methylene diphenyl diisocyanate or a prepolymer thereof.

2. The polyurethane composition of claim 1, wherein the methylene diphenyl diisocyanate is a prepolymer and has a % NCO content of 13 and a viscosity of 800 cPs at 45° C.

3. The polyurethane composition of claim 1, wherein the first part and second part are mixed in a ratio of between 1:1 and 2:1 of first part to second part by weight.

4. The polyurethane composition of claim 3, wherein the first part and second part are mixed in a ratio of between 1.5:1 and 1.9:1 first part to second part by weight.

5. The polyurethane composition of claim 1, further comprising an ultraviolet light absorber.

6. The polyurethane composition of claim 1, further comprising treated clay.

7. The polyurethane composition of claim 1, further comprising a tin catalyst.

8. The polyurethane composition of claim 1, further comprising a moisture absorbing compound.

9. The polyurethane composition of claim 1, further comprising a heterocyclic mildewcide.

10. The polyurethane composition of claim 1, further comprising a silane compound.

11. The polyurethane composition of claim 1, wherein the polyurethane composition experiences less than a 20% reduction in tensile stress at break after exposure to ultraviolet light for 2160 hours.

12. The polyurethane composition of claim 1, wherein the polyurethane composition has a glass transition temperature of less than −40° C. measured according to differential scanning calorimetry.

13. The polyurethane composition of claim 1, wherein the polyurethane composition is formed into an overmold of a fiber optic cable assembly.

\* \* \* \* \*